US012292575B2

(12) United States Patent
Kamakura

(10) Patent No.: US 12,292,575 B2
(45) Date of Patent: May 6, 2025

(54) HEAD MOUNTED DISPLAY HAVING LEFT AND RIGHT FRAMES WITH COUPLING MECHANISMS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 618 days.

(21) Appl. No.: 17/586,415

(22) Filed: Jan. 27, 2022

(65) Prior Publication Data
US 2022/0236579 A1   Jul. 28, 2022

(30) Foreign Application Priority Data
Jan. 28, 2021   (JP) ................................. 2021-011760

(51) Int. Cl.
G02B 27/01   (2006.01)

(52) U.S. Cl.
CPC ..... *G02B 27/0176* (2013.01); *G02B 27/0172* (2013.01); *G02B 2027/013* (2013.01); *G02B 2027/0161* (2013.01); *G02B 2027/0169* (2013.01); *G02B 2027/0178* (2013.01)

(58) Field of Classification Search
CPC ............ G02B 27/0176; G02B 27/0172; G02B 2027/013; G02B 2027/0161; G02B 2027/0169; G02B 2027/0178
See application file for complete search history.

(56) References Cited

U.S. PATENT DOCUMENTS

| | | | |
|---|---|---|---|
| 2002/0036597 A1 | 3/2002 | Chigira et al. | |
| 2008/0186586 A1 | 8/2008 | Yamamoto | |
| 2010/0164840 A1* | 7/2010 | Yamamoto | G02B 27/0172 345/8 |
| 2012/0169573 A1* | 7/2012 | Billon | H04N 13/344 345/7 |
| 2017/0168305 A1* | 6/2017 | Kusuda | G02B 27/0176 |
| 2017/0307896 A1* | 10/2017 | Kovaluk | G06T 19/006 |
| 2018/0003989 A1* | 1/2018 | Terada | G02B 27/0176 |
| 2018/0124366 A1* | 5/2018 | Kusuda | G03B 21/28 |
| 2020/0278557 A1* | 9/2020 | Greenstein | G02B 27/0172 |
| 2021/0127774 A1* | 5/2021 | Schroder | G02B 27/0179 |
| 2022/0404619 A1* | 12/2022 | Hahn | G02B 27/283 |
| 2023/0266597 A1 | 8/2023 | Greenstein et al. | |

FOREIGN PATENT DOCUMENTS

| | | | |
|---|---|---|---|
| JP | 2000-010503 A | | 1/2000 |
| JP | 2006-054618 A | | 2/2006 |
| JP | 2007-336166 A | | 12/2007 |
| JP | 2016195313 A | * | 11/2016 |
| JP | 2017-211674 A | | 11/2017 |
| WO | 2019/077614 A1 | | 4/2019 |

* cited by examiner

Primary Examiner — Bao-Luan Q Le
(74) Attorney, Agent, or Firm — Oliff PLC

(57) ABSTRACT

An image display device includes a first display unit including a first frame and a first optical system, a second display unit including a second frame and a second optical system, and a fixing member configured to fix the first display unit and the second display unit relative to each other, wherein the fixing member has a shape configured to rotate the first optical system and the second optical system in rotational directions around two or more axes when the first display unit and the second display unit are aligned prior to fixing.

9 Claims, 14 Drawing Sheets

HEAD MOUNTED DISPLAY HAVING LEFT AND RIGHT FRAMES WITH COUPLING MECHANISMS

The present application is based on, and claims priority from JP Application Serial Number 2021-011760, filed Jan. 28, 2021, the disclosure of which is hereby incorporated by reference herein in its entirety.

BACKGROUND

1. Technical Field

The present disclosure relates to an image display device that enables observation of a virtual image, and particularly relates to an image display device including a display unit for both eyes.

2. Related Art

An eyeglass virtual image display device is known in which an optical system for the left eye from a first display element to a light-guiding member and an optical system for the right eye from a second display element to the light-guiding member are assembled with a frame extending in a lateral direction by screwing, etc. to arrange the left and right optical systems in front of the eyes (JP-A-2017-211674). Note that, in this virtual display device, in order to reduce the effects of manufacturing tolerances and assembly tolerances, the display element is aligned with the optical system using a convex portion provided at one of a holding member of the display element and a lens barrel of a projection lens, and a concave portion provided at the other.

In the device of JP-A-2017-211674 described above, the final arrangement is determined by assembling the optical system for the left eye and the optical system for the right eye to the frame, therefore, there is a possibility of being affected by manufacturing tolerances of the frame and assembly tolerances of the frame.

SUMMARY

An image display device according to one aspect of the present disclosure includes a first display unit that includes a first frame, a second display unit that includes a second frame, and a fixing member that fixes a first position of the first display unit with respect to a second position the second display unit, wherein the fixing member rotates the second display unit with respect to the first display unit system in rotational directions around two or more axes.

A manufacturing method for an image display device according to one aspect of the present disclosure is a manufacturing method for an image display device including a first display unit including a first frame and a first optical system, a second display unit including a second frame and a second optical system, and a fixing member configured to fix the first display unit and the second display unit relative to each other, wherein the fixing member has a shape configured to rotate the first optical system and the second optical system in rotational directions around two or more axes, the fixing member being configured to, after alignment, stop rotation of the first optical system and the second optical system with respect to the fixing member.

DESCRIPTION OF EXEMPLARY EMBODIMENTS

Hereinafter, a structure, operation, manufacturing method, etc. of an image display device according to the present disclosure will be described with reference to FIGS. 1 to 3, etc.

Figure 1:
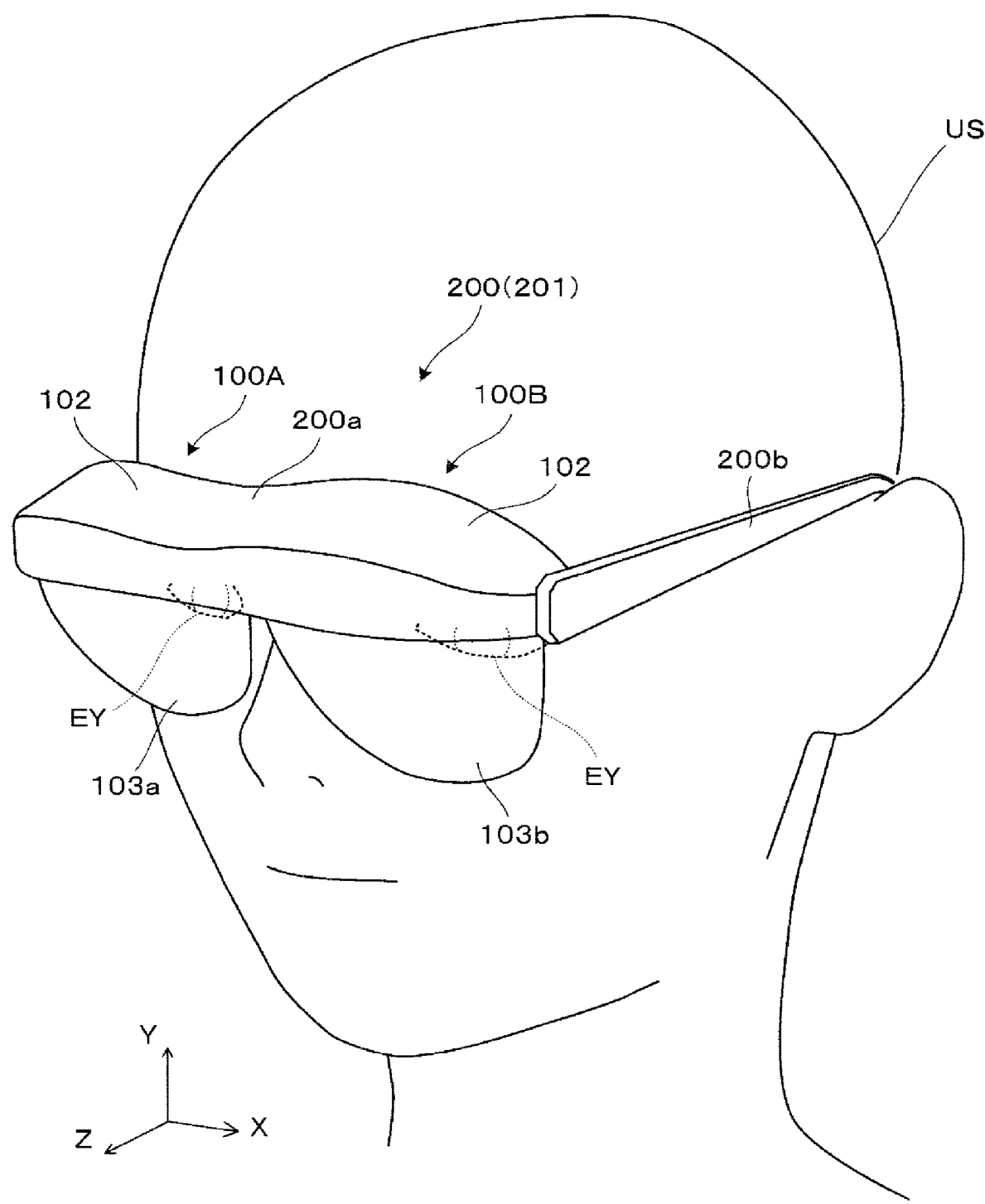
FIG. 1 is an external perspective view illustrating a wearing state of an image display device according to a first exemplary embodiment.
Figure 2:
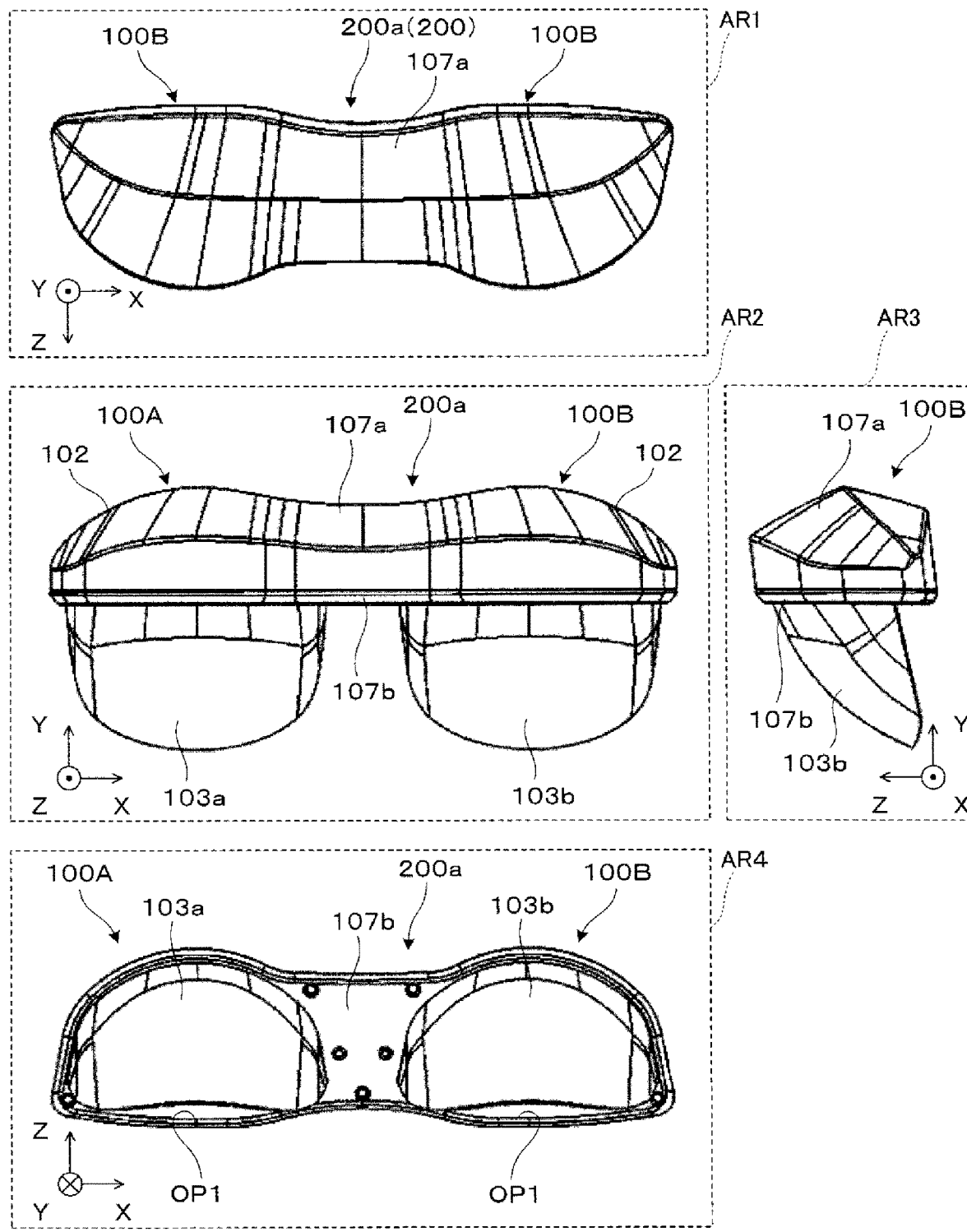
FIG. 2 is a plan view, front view, side view, and bottom view of the image display device.

FIG. 1 is a diagram illustrating a wearing state of an image display device 200. The image display device 200 is a head-mounted display (hereinafter, also referred to as HMD) 201, and causes an observer or a wearer US who wears the head-mounted display 201 to recognize an image as a virtual image. In FIG. 1, etc., X, Y, and Z correspond to an orthogonal coordinate system, a +X direction corresponds to a lateral direction in which the two eyes EY of the observer or wearer US who is wearing the image display device 200 or HMD 201 are arranged, a +Y direction corresponds to an upward direction orthogonal to the lateral direction in which the two eyes EY of the wearer US are arranged, and a +Z direction corresponds to a direction to the front or a forward direction for the wearer US. A ±Y direction is parallel to a vertical axis or a vertical direction.

The image display device 200 includes a main body 200a disposed to cover the front of the wearer US and a pair of temple support devices 200b that support the main body 200a. The main body 200a, when functionally viewed, includes a first display device 100A for the right eye and a second display device 100B for the left eye. The first display device 100A includes a display driving unit 102 disposed at an upper portion thereof, and a combiner 103a that is shaped like a spectacle lens and covers the front of the eye. Similarly, the second display device 100B includes a display driving unit 102 disposed at an upper portion thereof, and a combiner 103b that is shaped like a spectacle lens and covers the front of the eye.

The appearance of the main body 200a of the image display device 200 will be described with reference to FIG. 2. In FIG. 2, a region AR1 is a plan view of the main body 200a, a region AR2 is a front view of the main body 200a, a region AR3 is a right side view of the main body 200a, and a region AR4 is a bottom view of the main body 200a. A pair of the display driving units 102 disposed on the +Y side or the upper side of the main body 200a are coupled and integrated, and are covered by a dome-shaped upper exterior member 107a elongated in the lateral direction and a flat plate-shaped lower exterior member 107b. The first combiner 103a and the second combiner 103b have a shape such that an upper portion of a hemisphere protruding in the forward or the +Z direction is cut, and is disposed so as to protrude downward from the lower exterior member 107b.

Figure 3:
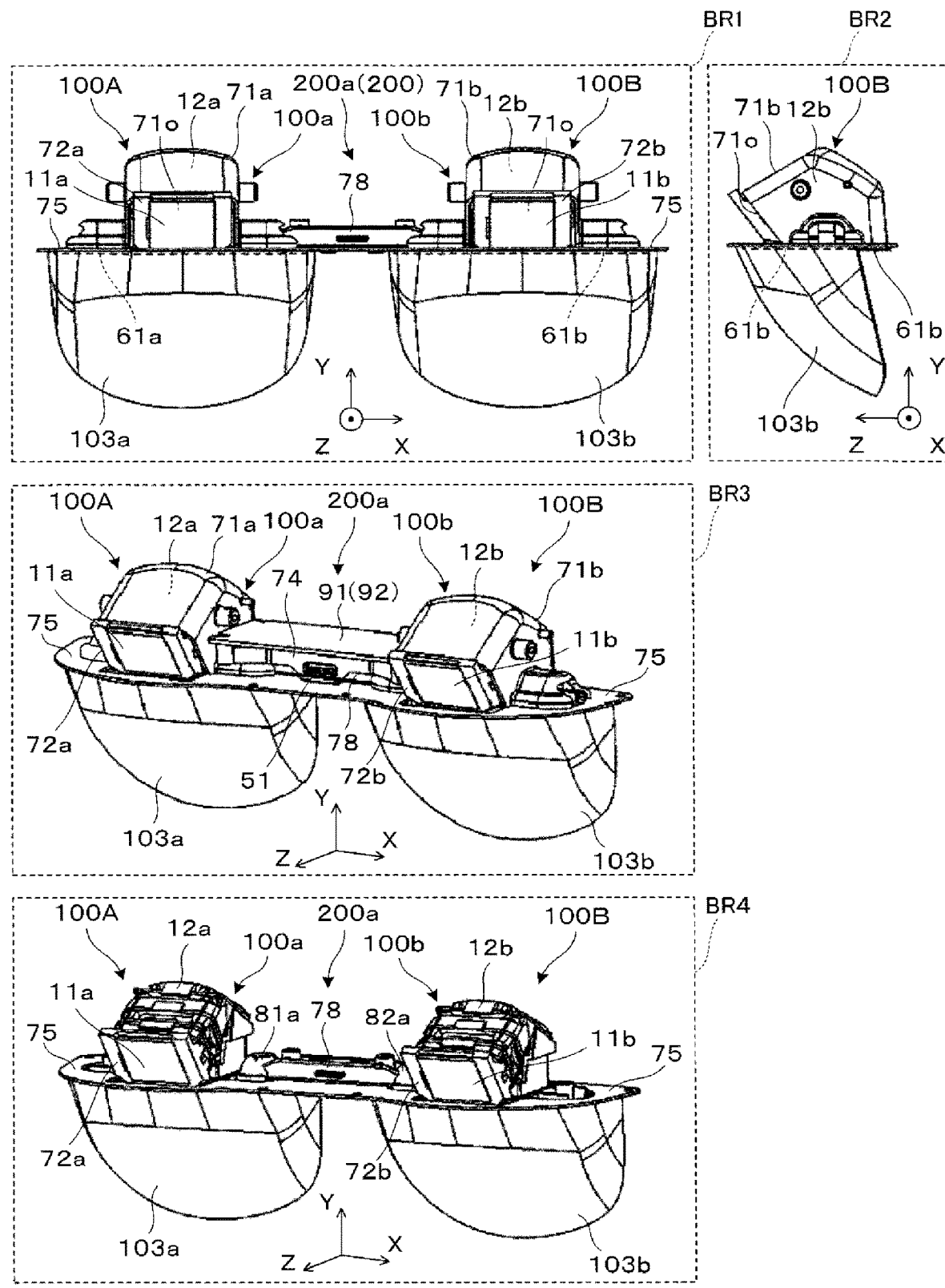
FIG. 3 is a front view, side view, perspective view, etc. illustrating an interior of the image display device with an exterior member removed.

With reference to FIG. 3, an overview of an internal structure in which the upper exterior member 107a and the lower exterior member 107b have been removed from the main body 200a illustrated in FIG. 2 will be described. In FIG. 3, a region BR1 is a front view with an upper portion of the main body 200a exposed, a region BR2 is a right side view with the upper portion of the main body 200a exposed, a region BR3 is a perspective view with the upper portion of the main body 200a exposed, and a region BR4 is a perspective view with an internal optical system of the main body 200a exposed. The first display device 100A for the right eye includes a first display element 11a, a first optical system 12a, and the first combiner 103a, as the first display unit 100a. A first frame 61a described below is also an element of the first display unit 100a. The first optical system 12a is covered with a first cover member 71a, which is an inner cover. The first display element 11a is disposed so as to close an opening 710 of the first cover member 71a, and is fixed to an outer frame of the first optical system 12a via a first holder 72a having a rectangular frame shape.

Figure 4:
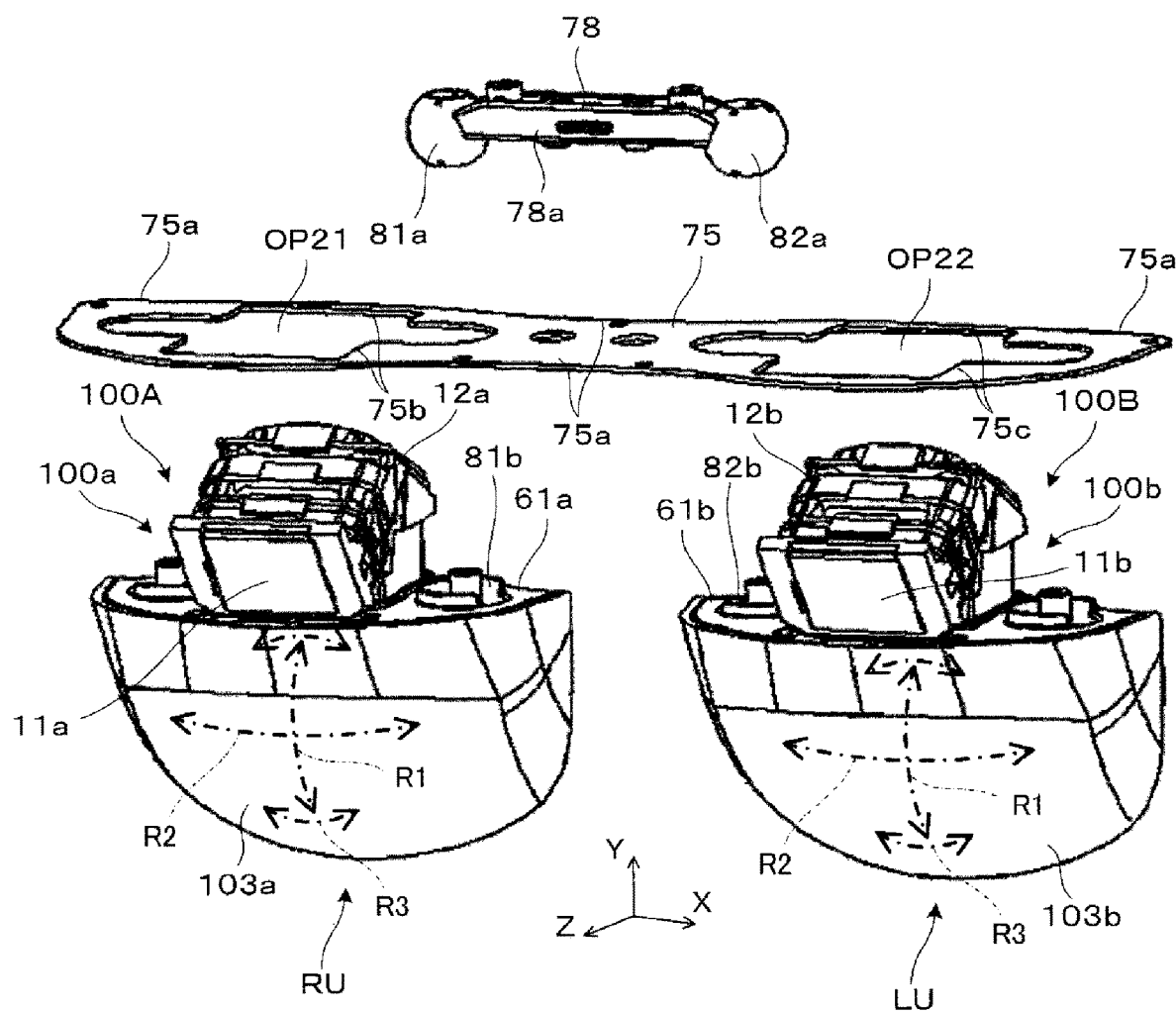
FIG. 4 is an exploded perspective view of the remainder of the portion where the exterior member is removed from the image display device.

As illustrated in FIG. 4, the first optical system 12a is fixed to an upper surface of the plate-shaped first frame 61a by adhesion, etc., and the first combiner 103a is fixed to the front half of the periphery of the first frame 61a by adhesion, etc. at an upper end thereof.

Referring back to FIG. 3, the second display device 100B includes a second display element 11b, a second optical system 12b, and the second combiner 103b, as the second display unit 100b. A second frame 61b described below is also an element of the second display unit 100b. The second optical system 12b is covered with a second cover member 71b, which is an inner cover. The second display element 11b is disposed so as to close the opening 710 of the second cover member 71b, and is fixed to an outer frame of the second optical system 12b via the second holder 72b having a rectangular frame shape. The second display device 100B for the left eye has the same structure and function as the first display device 100A for the right eye. In other words, the second display element 11b is the same as the first display element 11a, the second optical system 12b is the same as the first optical system 12a, and the second combiner 103b is the same as the first combiner 103a. However, in a case where the first optical system 12a, the first combiner 103a, etc. have asymmetry with respect to the left and right X direction, the second optical system 12b, the second combiner 103b, etc. are obtained by laterally inverting the first optical system 12a, the first combiner 103a, etc.

As illustrated in FIG. 4, the second optical system 12b is fixed to an upper surface of the plate-shaped second frame 61b by adhesion, etc., and the second combiner 103b is fixed to the front half of the periphery of the second frame 61b by adhesion, etc. at an upper end thereof.

Referring back to FIG. 3, the first display device 100A and the second display device 100B are coupled via a fixing member 78 therein. The fixing member 78 is a rod-shaped metal member, and is formed from, for example, a magnesium alloy. By forming the fixing member 78 from the magnesium alloy, the first frame 61a and the second frame 61b can be cooled by heat dissipation. The fixing member 78 fixes the first display unit 100a and the second display unit 100b relative to each other at both ends thereof. The fixing member 78 is a member corresponding to an arm of a balance, and supports a pair of the display units 100a, 100b corresponding to a pair of plates in the center. The fixing member 78 has a shape that allows the first optical system 12a and the second optical system 12b to rotate in rotational directions around two or more axes when the first display unit 100a and the second display unit 100b are aligned prior to fixing.

Figure 5:
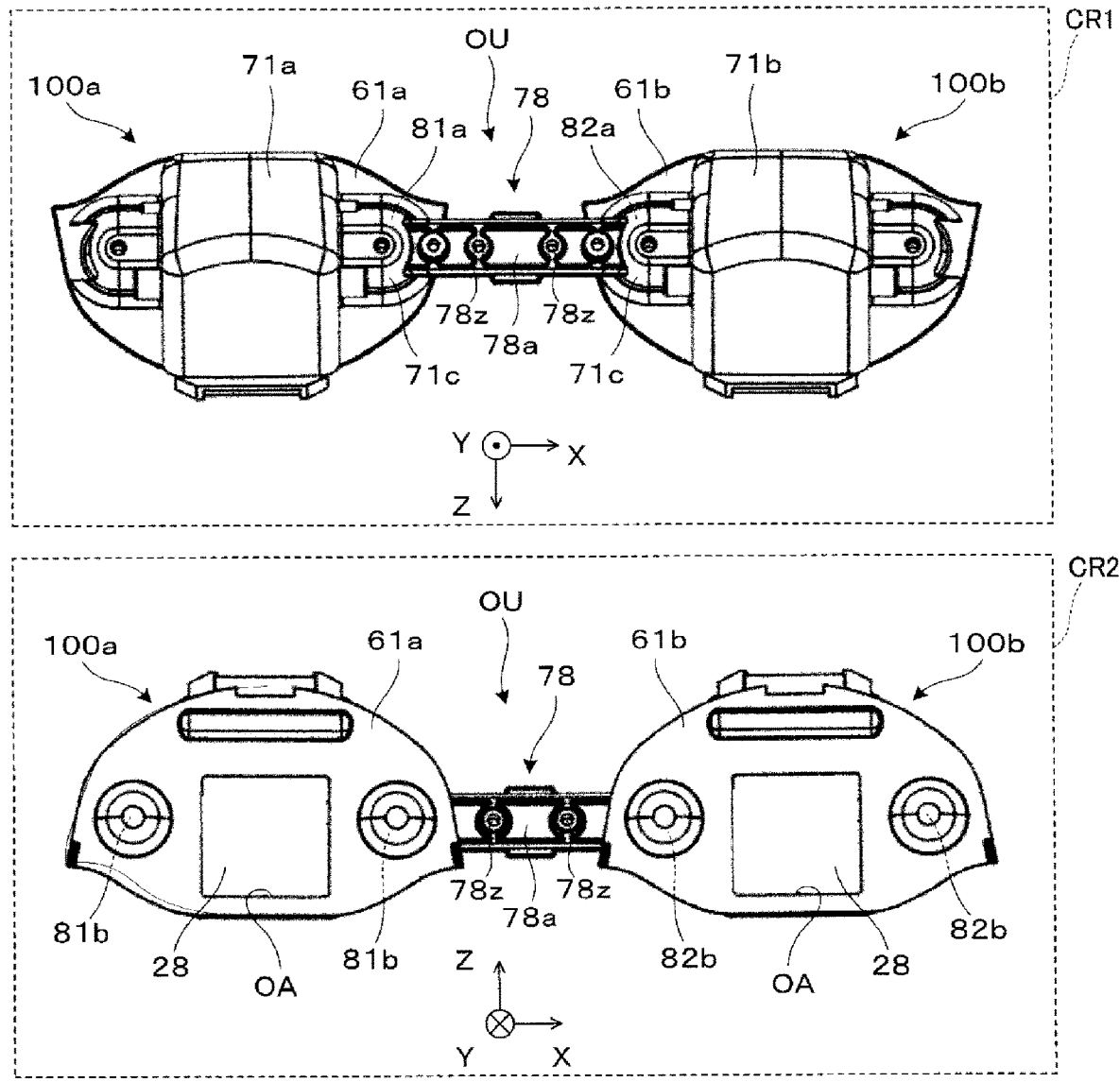
FIG. 5 is a plan view and a bottom view of an optical unit at which left and right display units are combined.
Figure 6:
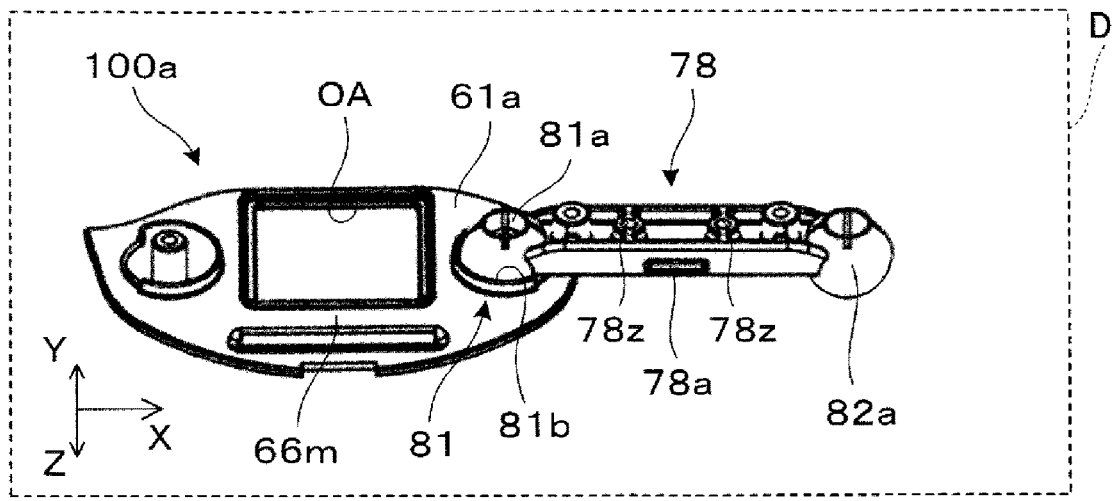
FIG. 6 illustrates a perspective view describing a coupling between a first frame and a fixing member, a perspective view describing a positional relationship between the fixing member and a first cover member, and a perspective view describing a positional relationship between the first frame, the fixing member, and the first cover member.
Figure 6:
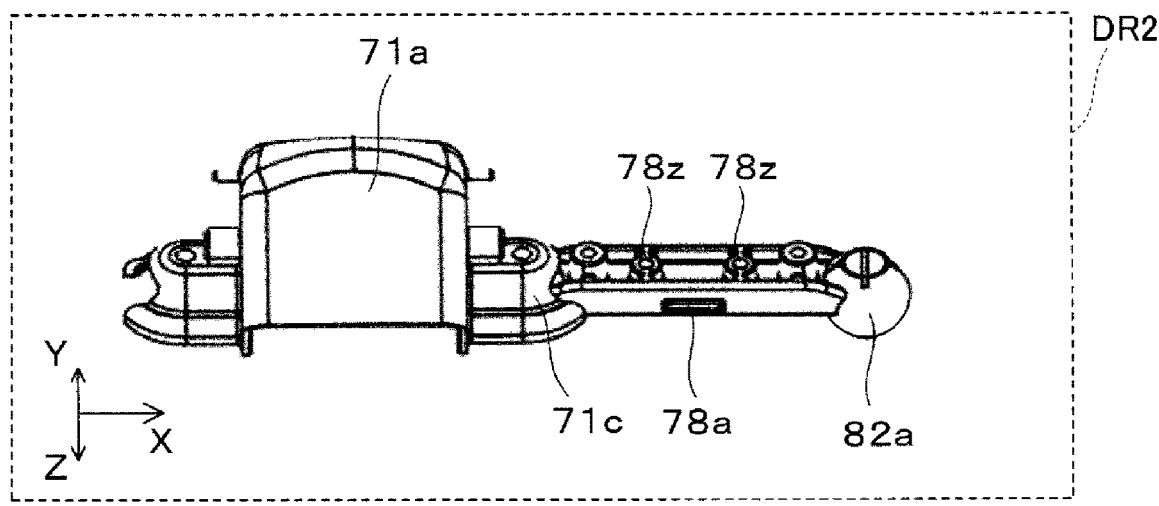
Figure 6:
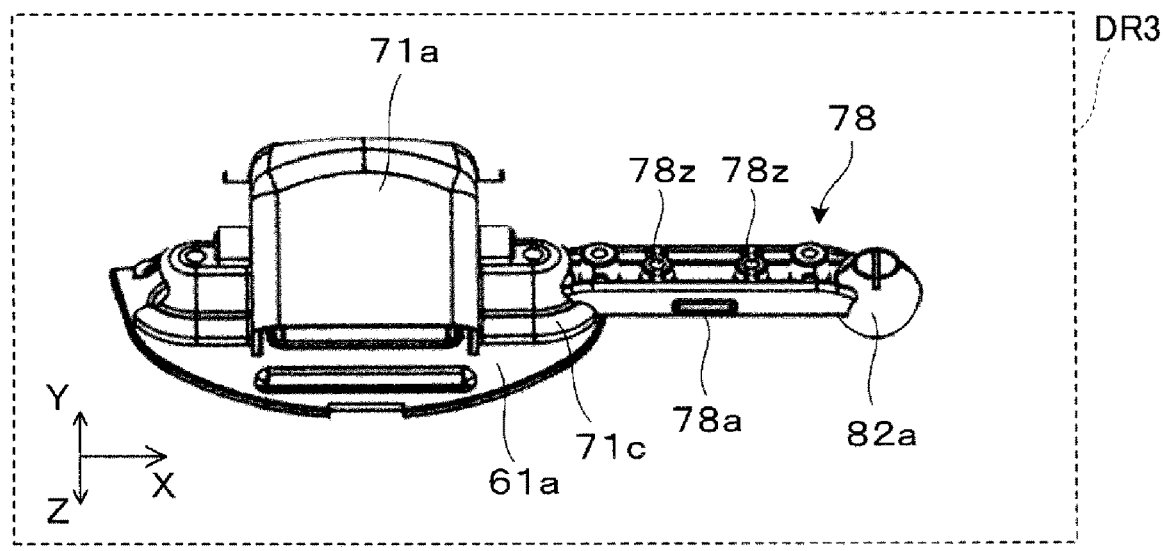

The support of the first display unit 100a and the second display unit 100b by the fixing member 78 will be described with reference to FIGS. 4 to 6. In FIG. 5, a region CR1 is a plan view of an optical unit OU coupled to the left and right display units 100a, 100b, and a region CR2 is a bottom view of the optical unit OU. In FIG. 6, a region DR1 is a perspective view describing a coupling between the first frame 61a and the fixing member 78, a region DR2 is a perspective view describing a positional relationship between the fixing member 78 and the first cover member 71a, and a region DR3 is a perspective view describing a positional relationship between the first frame 61a, the fixing member 78, and the first cover member 71a. Fixing portions 81a, 82a, which are spherical members similar to those of the ball joint components, are formed at both ends of the fixing member 78. After the first display unit 100a and the second display unit 100b are aligned, these fixing portions 81a, 82a are adhered to concave portions 81b, 82b, which are hemispherical indentation members provided at the inner ends of the display units 100a, 100b or the frame 61a, 61b by an adhesive material, etc., whereby the rotation is stopped. A photocurable resin material can be used as the adhesive material for fixing the fixing portions 81a, 82a to the concave portions 81b, 82b, however, without being limited thereto, a thermosetting or room temperature curing resin material, etc. can be used. A coupling member 81 that combines the fixing portion 81a and the concave portion 81b is covered by an extending portion 71c of the first cover member 71a. A coupling member 82 that combines the fixing portion 82a and the concave portion 82b is also covered by an extending portion 71c of the second cover member 71b.

The first frame 61a is a semi-circular plate-shaped metal member, and is formed, for example, from a magnesium alloy. By forming the first frame 61a from the magnesium alloy, heat dissipation efficiency of heat generated by the display element 11a, etc. can be increased. The concave portions 81b are formed at both the left and right ends of the first frame 61a, but only one of the concave portions 81b is used for coupling with the fixing member 78. An optical aperture OA is formed at the first frame 61a, and a plate-shaped optical element 28 that seals the optical aperture OA is disposed. The plate-shaped optical element 28 is part of the first optical system 12a. The second frame 61b is a semi-circular metal member, and is formed, for example, from a magnesium alloy. By forming the second frame 61b from the magnesium alloy, heat dissipation efficiency of heat generated by the display element 11b, etc. can be increased. The concave portions 82b are formed at both the left and right ends of the second frame 61b, but only one of the concave portions 82b is used for coupling with the fixing member 78. An optical aperture OA is also formed at the second frame 61b, and a plate-shaped optical element 28 that seals the optical aperture OA is disposed.

Figure 7:
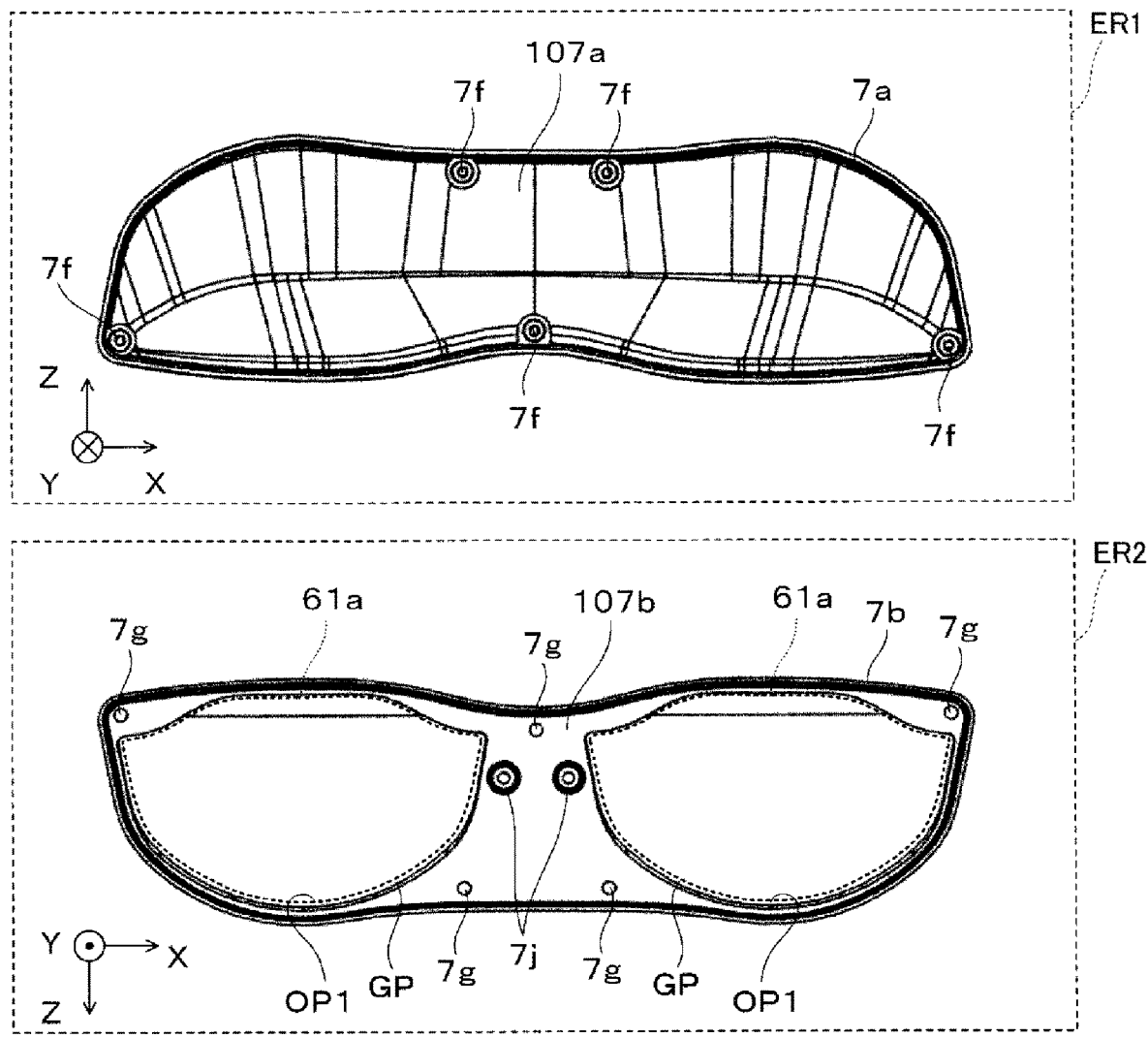
FIG. 7 illustrates a bottom view of an upper exterior member and a plan view of a lower exterior member.

The upper exterior member 107a and the lower exterior member 107b will be described with reference to FIG. 7. In FIG. 7, a region ER1 is a bottom view illustrating the inside of the upper exterior member 107a, and a region ER2 is a plan view illustrating the inside of the lower exterior member 107b. The upper exterior member 107a and the lower exterior member 107b are formed from a resin material. An outer edge 7a of the upper exterior member 107a and an outer edge 7b of the lower exterior member 107b have the same shape. By abutting them, a space for accommodating the first optical system 12a and the second optical system 12b illustrated in FIG. 3 can be formed. The upper exterior member 107a and the lower exterior member 107b are fixed using fastening portions 7f, 7g, which are screw holes, etc. The lower exterior member 107b has a pair of openings OP1, and the first frame 61a and the second frame 61b can be disposed at the openings OP1, as indicated by a dotted lines. Gaps GP are provided between the openings OP1 and the frames 61a, 61b, and allows the frames 61a, 61b to shift in position with respect to the X-Y plane or the Y direction within the openings OP1. That is, the first display unit 100a and the second display unit 100b illustrated in FIG. 3, etc. are fixed to the lower exterior member 107b while remaining aligned with each other, and even in a state of being accommodated in the upper exterior member 107a and the lower exterior member 107b, the positional relationship between the display units 100a, 100b upon completion of positioning is maintained. Screwing hole 7j are formed at the lower exterior member 107b and can be fixed by screwing to a pair of fastening portions 78z provided at a bridge 78a of the fixing member 78.

Referring to FIGS. 3 and 4, an elastic sheet 75 is disposed above the first frame 61a and the second frame 61b. An outer circumferential portion 75a of the elastic sheet 75 is sandwiched between the outer edge 7a of the upper exterior member 107a illustrated in FIG. 7 and the outer edge 7b of the lower exterior member 107b to allow hermetic or liquid-tight sealing between the outer exterior members 107a, 107b. A pair of openings OP21 and OP22 are formed at the elastic sheet 75. An inner circumferential portion 75b around one opening OP21 is disposed so as to be sandwiched between the upper surface of the first frame 61a and the lower end of the first cover member 71a at the inner end, and is adhered to the upper surface of the first frame 61a at a position corresponding to the outer edge of the first frame 61a, to allow hermetic or liquid-tight sealing between the first frame 61a and the first cover member 71a. An inner circumferential portion 75c around the other opening OP22 is disposed so as to be sandwiched between the upper surface of the second frame 61b and the lower end of the second cover member 71b at the inner end, and is adhered to the upper surface of the second frame 61b at a position corresponding to the outer edge of the second frame 61b, to allow hermetic or liquid-tight sealing between the second frame 61b and the second cover member 71b.

With reference to FIG. 3, a rectangular plate-shaped circuit board 91 is disposed above the fixing member 78 between the left and right display units 100a, 100b. The circuit board 91 includes a control device 92 that controls display operation of the first display element 11a and the second display element 11b. The control device 92 outputs a drive signal corresponding to the display image to the left and right display elements 11a, 11b to control the display operation of the left and right display elements 11a, 11b. The control device 92 includes, for example, an IF circuit, a signal processing circuit, etc., and causes the left and right display elements 11a, 11b to display a two-dimensional image according to the image data or the image signal received from the outside. Although not shown, the control device 92 includes a main board that controls the operation of the first display device 100A and the operation of the second display device 100B. The main substrate may have, for example, an interface function that communicates with an external device (not shown) and performs signal conversion on a signal received from the external device, and an integrated function that links between the display operation of the first display device 100A and the display operation of the second display device 100B.

The circuit board 91 is supported on the fixing member 78 by a substrate support portion 74. The circuit board 91 is fixed at the substrate support portion 74. The substrate support portion 74 is a member made of resin covering the fixing member 78 from the upper, front, and rear, and is detachable from the fixing member 78 together with the circuit board 91 by a snap fit using a fitting portion 51.

Figure 8:
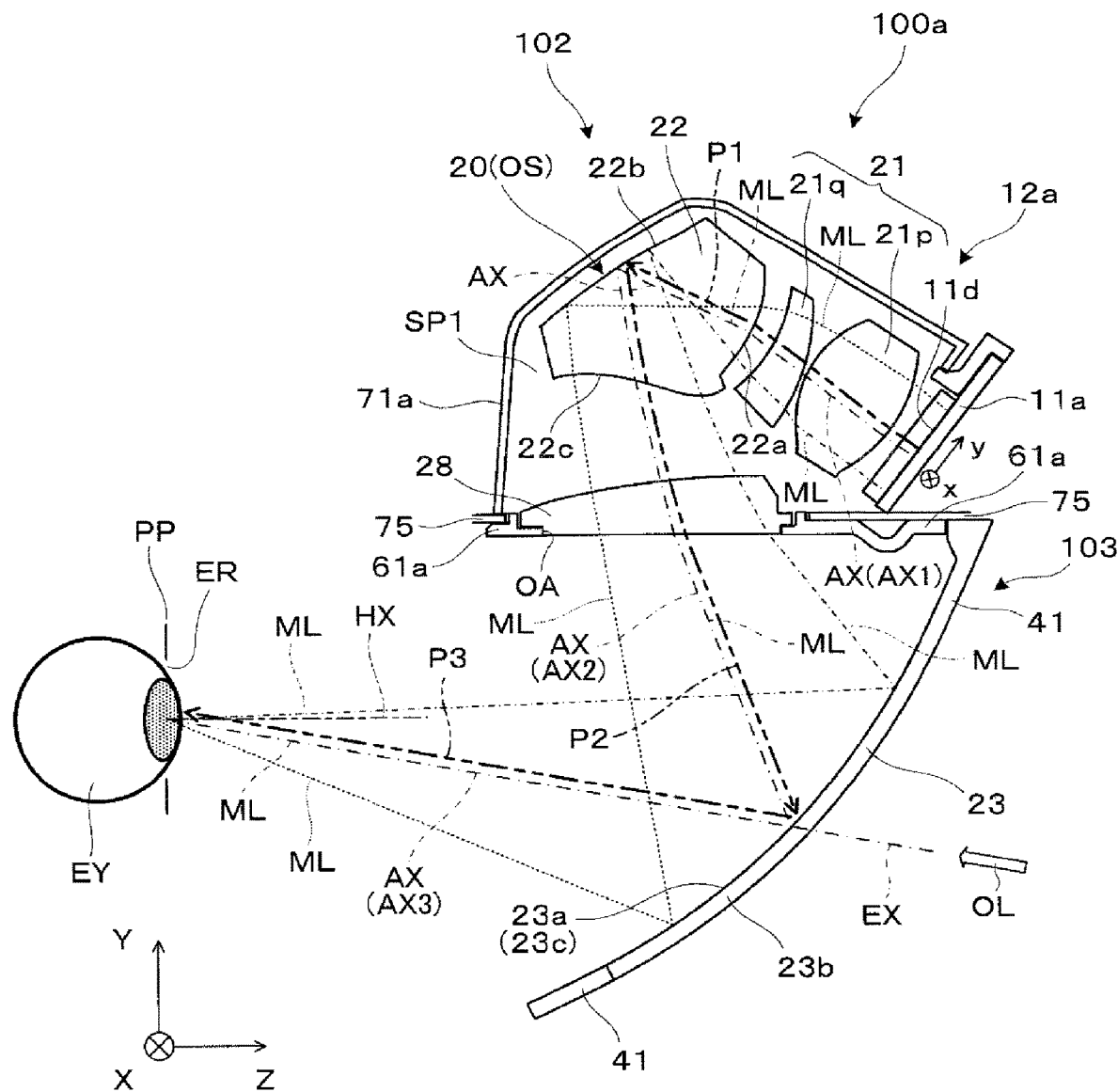
FIG. 8 is a conceptual side cross-sectional view illustrating an optical system inside the image display device.

FIG. 8 is a side cross-sectional view illustrating an optical structure of the first display unit 100a. The first display unit 100a includes the first display element 11a and an imaging optical system 20. The imaging optical system 20 is also referred to as a light guide optical device. The imaging optical system 20 includes a projection lens 21, a prism mirror 22, the plate-shaped optical element 28, and a see-through mirror 23. The projection lens 21, the prism mirror 22, and the plate-shaped optical element 28 of the imaging optical system 20 correspond to the first optical system 12a illustrated in FIG. 3, etc., and the see-through mirror 23 corresponds to the first combiner 103a. The first display element 11a, the projection lens 21, and the prism mirror 22 are fixed to the first frame 61a in a state of being aligned with each other by a frame body (not illustrated), and is accommodated in a space SP1 sandwiched between the first cover member 71a and the first frame 61a. The plate-shaped optical element 28 is disposed so as to be fitted into a step formed at the optical aperture OA of the first frame 61a, and the periphery of the optical aperture OA is kept airtight state.

The first display element 11a is a spontaneous light emission type display device. The first display element 11a is, for example, an organic EL (Organic Electro-luminescence) display, and forms a color still image or moving image on a two-dimensional display surface 11d. The first display element 11a is disposed along the X-Y plane that is inclined by being rotated about the X-axis with respect to an X-Y plane. The first display element 11a is driven by the control device 92 provided at the circuit board 91 to perform display operation. The first display element 11a is not limited to the organic EL display, and can be replaced with a micro LED display or a display device using an inorganic EL, an organic LED, a laser array, a quantum dot light emitting element, etc. The first display element 11a is not limited to a spontaneous light emission type imaging light generation device, and may include an LCD and another light modulation element, and may form an image by illuminating the light modulation element with a light source such as a backlight. As the first display element 11a, a LCOS (Liquid crystal on silicon, LCoS is a registered trademark), a digital micro-mirror device, etc. may be used instead of an LCD.

The projection lens 21 causes the imaging light ML emitted from the first display element 11a to pass therethrough and then to be incident on the prism mirror 22. The projection lens 21 focuses the imaging light ML emitted from the first display element 11a into a state close to a parallel luminous flux. The projection lens 21 includes a first lens 21p and a second lens 21q. The prism mirror 22 has an inner reflection surface 22b, and causes the imaging light ML emitted from the projection lens 21 to be incident on a light incident surface 22a, to be totally reflected by the inner reflection surface 22b, and to be emitted from a light emission surface 22c. At this time, the prism mirror 22 emits the imaging light ML incident from the front such that it is bent in a direction inclined with respect to a direction in which an incident direction is reversed (a direction of the light source seen from the prism mirror 22). The plate-shaped optical element 28 causes the imaging light ML from the prism mirror 22 to pass therethrough while refracting it, and then to be incident on the see-through mirror 23.

The see-through mirror 23 is a curved plate-shaped optical member that serves as a concave surface mirror, and reflects the imaging light ML incident from the prism mirror 22 via the plate-shaped optical element 28 toward a pupil position PP. The pupil position PP is a position at which the imaging light ML from each of points on the display surface 11d is incident so as to be overlapped from an angular direction corresponding to a position of each of points on the display surface 11d in a predetermined divergent state or a parallel state. The see-through mirror 23 covers the pupil position PP at which the eye EY or the pupil is disposed, has a concave shape toward the pupil position PP, and has a convex shape toward the outside. The see-through mirror 23 is a mirror plate having a structure in which a mirror film 23c is formed at a front surface or a back surface of a plate-shaped body 23b. The reflection surface 23a of the see-through mirror 23 has transmissive properties. The external light OL that has passed through the see-through mirror 23 and a support plate 41 therearound is also incident on the pupil position PP. In other words, the wearer US wearing the image display device 200 can observe a virtual image of the imaging light ML in a state in which the imaging light ML overlaps with the external image.

In the above, optical surfaces constituting the projection lens 21, the prism mirror 22, the plate-shaped optical element 28, and the see-through mirror 23 includes a free-form surface, and at least some of the optical surfaces may be replaced with an aspheric surface or a spherical surface.

The imaging optical system 20 is an off-axis optical system OS due to the see-through mirror 23 being a concave mirror, etc. In the case of the present exemplary embodiment, the projection lens 21, the prism mirror 22, the plate-shaped optical element 28, and the see-through mirror 23 are disposed non-axisymmetric and have a non-axisymmetric optical surface. In the imaging optical system 20, that is, the off-axis optical system OS, an optical axis AX is bent so that the optical axis AX extends along an off-axis surface (a surface parallel to the Y-Z surface) corresponding to a plane of the drawing. In the imaging optical system 20, the optical elements 21, 22, and 23 are arranged along the off-axis surface by bending the optical axis AX in the off-axis plane parallel to the Y-Z plane. The imaging optical system 20 includes optical axis portions AX1, AX2, and AX3 that are disposed along the off-axis surface (a surface parallel to the Y-Z plane) which is a reference surface extending in the longitudinal direction and are inclined with respect to each other before and after the reflection surface. The optical axis AX as a whole extends along an optical path of the main rays emitted from the center of the display element 11a and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are arranged to be bent in a Z shape in two stages.

Figure 9:
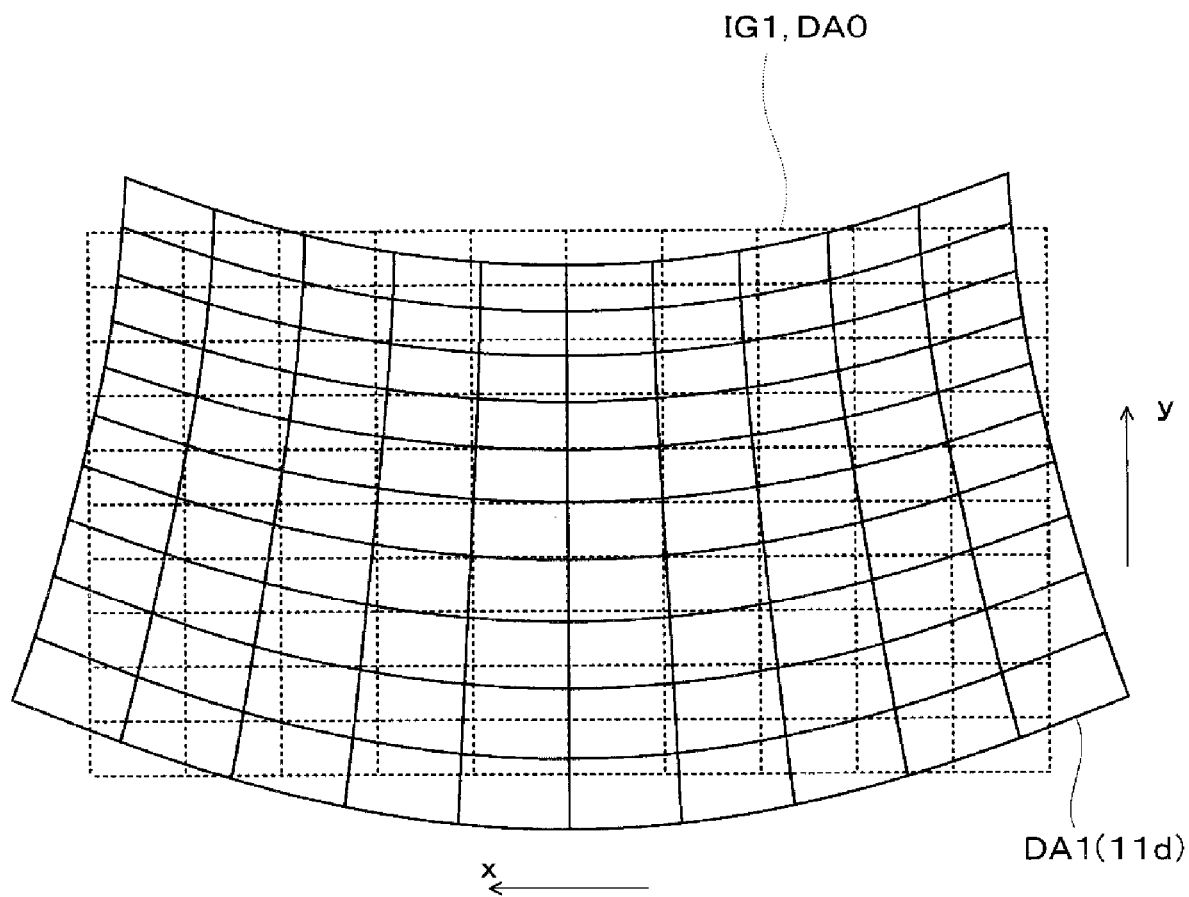
FIG. 9 is a diagram illustrating distortion correction of a display image.

As illustrated in FIG. 9, the display image formed at the display surface 11d of the first display element 11a is set to a modified image DA1 having a distortion such as trapezoidal distortion. That is, since the imaging optical system 20 is the off-axis optical system OS, it is not easy for the optical system itself to remove distortion such as trapezoidal distortion. In this way, a pixel array of a projected image IG1 of the virtual image observed at the pupil position PP via the imaging optical system 20 can be made into a grid pattern corresponding to an original display image DA0, and the outline thereof can be made rectangular by causing the image displayed on the first display element 11a to have reverse distortion that cancels out the distortion formed by the projection lens 21, the prism mirror 22, the plate-shaped optical element 28, and the see-through mirror 23. In other words, the first display element 11a corrects the distortion formed by the projection lens 21, the prism mirror 22, the plate-shaped optical element 28, and the see-through mirror 23. As a result, aberrations can be suppressed as a whole including the first display element 11a while allowing the distortion generated by the see-through mirror 23, etc. Thus, the degree of freedom in the arrangement and size of optical elements such as the prism mirror 22 is increased, and it is possible to easily secure the optical performance of the first display unit 100a while achieving miniaturization of the first display unit 100a.

Although the first display unit 100a has been described above, the second display unit 100b has a similar structure to that of the first display unit 100a, and thus a description of the specific structure thereof will be omitted.

Figure 10A:
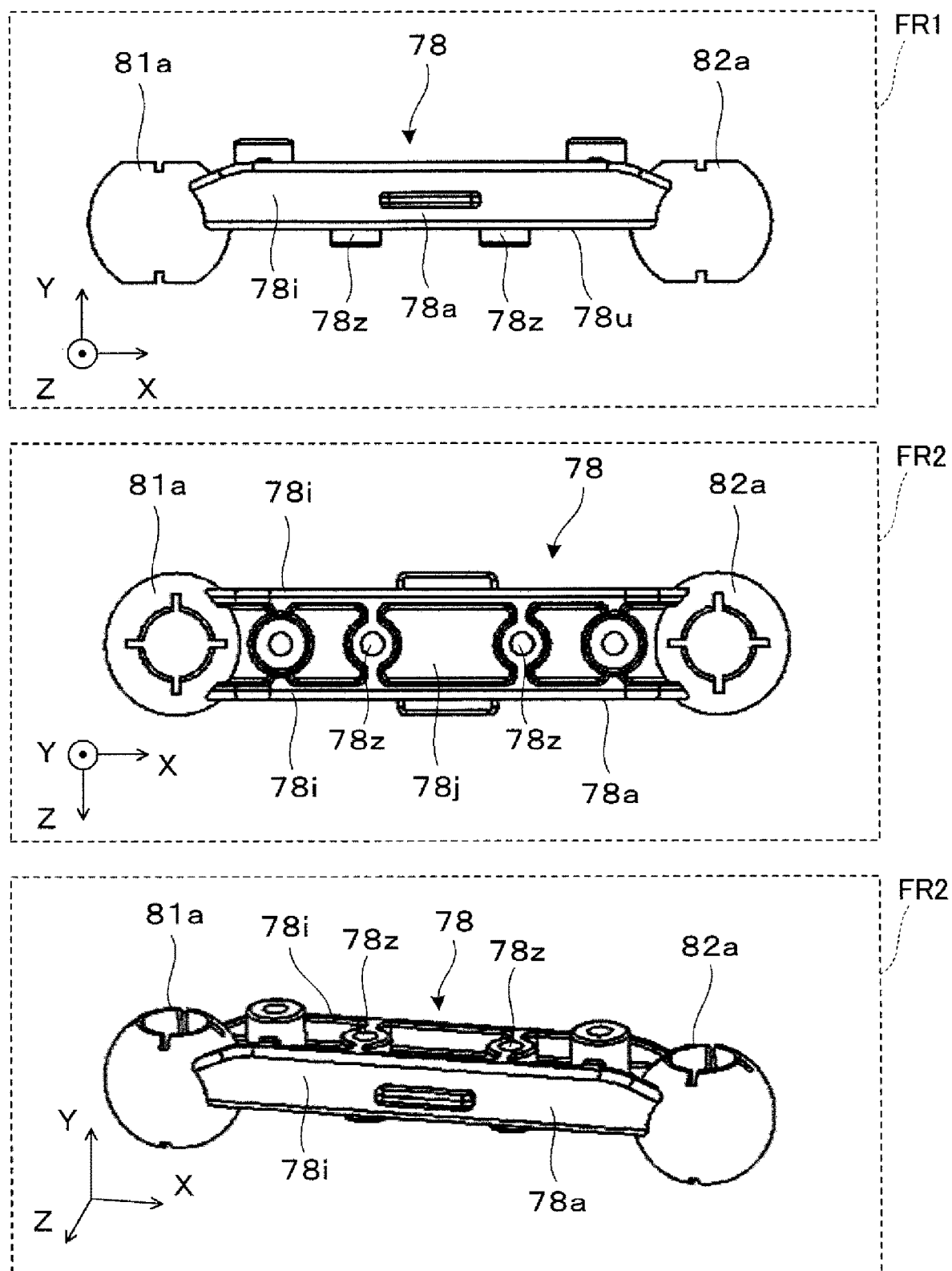
FIG. 10A is a front view, a plan view, and a perspective view of the fixing member.

Hereinafter, the fixing member 78 will be described with reference to FIG. 10A. In FIG. 10A, a region FR1 is a front view illustrating the fixing member 78, a region FR2 is a plan view of the fixing member 78, and a region FR3 is a perspective view of the fixing member 78. The fixing member 78 is a dumbbell-shaped member provided with a pair of spherical first fixing portion 81a and second fixing portion 82a on both ends of the bridge 78a. The bridge (coupling portion) 78a is a coupling portion that couples the first fixing portion 81a and the second fixing portion 82a. The bridge 78a has a shape in which both ends of an elongate web 78j extending along the X-Z plane are sandwiched between a pair of elongated flanges 78i extending along the X-Y plane. That is, the bridge 78a is a bar having an H-shape cross-section (see FIG. 10B). By configuring the bridge 78a as a member having a cross section H, the strength of the bridge 78a can be ensured and weight reduction can be achieved.

Figure 10B:
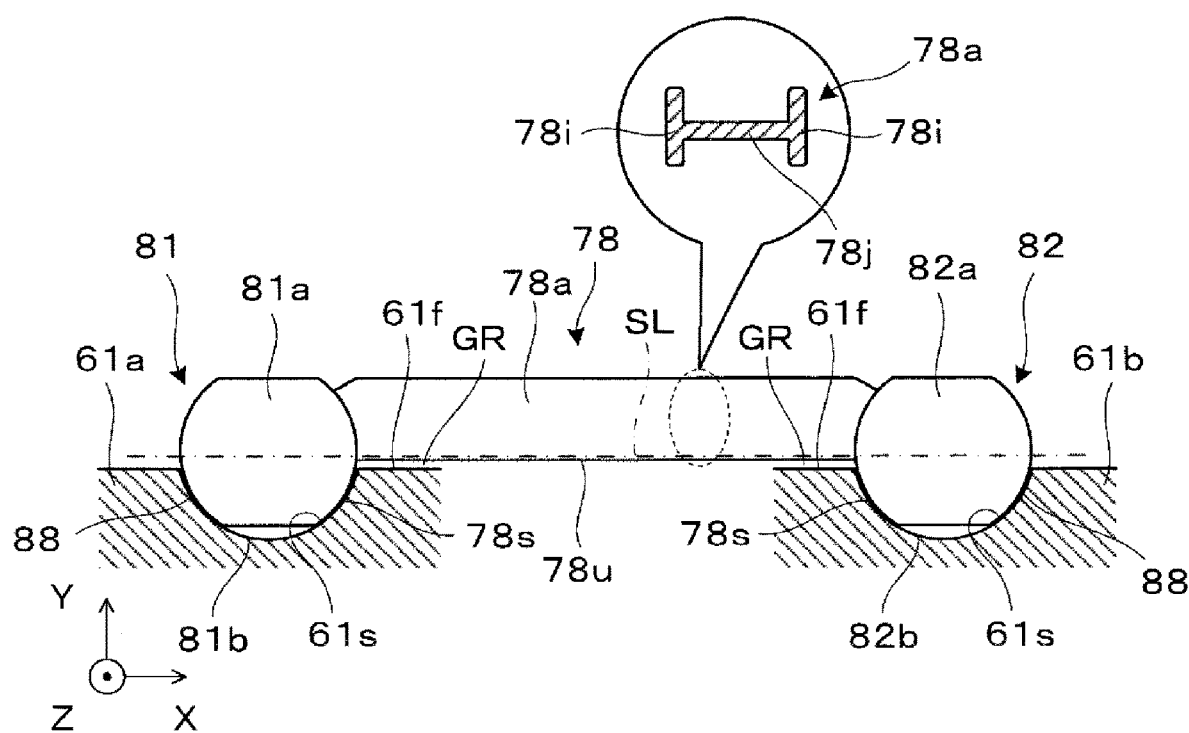
FIG. 10B is a conceptual cross-sectional view illustrating a fixed state of the fixing member to a frame.

Referring to FIGS. 10A and 10B, the coupling member 81, 82 will be described. The first fixing portion 81a, which is a spherical member formed at one end of the bridge 78a of the fixing member 78, is rotatably fitted into the first concave portion 81b, which is a hemispherical indentation member formed at the first frame 61a. A combination of the first fixing portion 81a and the first concave portion 81b is referred to as a first coupling member 81. A spherical convex surface of the first fixing portion 81*a* is referred to as an opposing surface 78*s*, and the spherical concave surface of the first concave portion 81*b* is referred to as an opposing surface 61*s*. The curvature of the opposing surface 78*s* of the first fixing portion 81*a* is set to be greater than the curvature of the opposing surface 61*s* of the first concave portion 81*b*. As a result, the adhesive material can be injected between the opposing surface 78*s* and the opposing surface 61*s* to form an adhesive layer 88 having sufficient thickness, and the adhesive strength between the first fixing portion 81*a* and the first concave portion 81*b* can be increased. The second fixing portion 82*a*, which is a spherical member formed at the other end of the bridge 78*a* of the fixing member 78, is rotatably fitted into the second concave portion 82*b*, which is a hemispherical indentation member formed in the second frame 61*b*. A combination of the second fixing portion 82*a* and the second concave portion 82*b* is referred to as a second coupling member 82. The curvature of the spherical opposing surface 78*s* of the second fixing portion 82*a* is set to be greater than the curvature of the spherical opposing surface 61*s* of the second concave portion 82*b*. As a result, the adhesive material can be injected between the opposing surface 78*s* and the opposing surface 61*s* to form an adhesive layer 88 having sufficient thickness, and the adhesive strength between the second fixing portion 82*a* and the second concave portion 82*b* can be increased.

A bottom surface 78*u* of the bridge (coupling portion) 78*a* is disposed at substantially the same position as a reference line SL extending through the center of symmetry of the first fixing portion 81*a*, or on the upper side or the +Y side of the reference line SL. In other words, the bridge 78*a* is coupled to the first fixing portion 81*a* and the second fixing portion 82*a* on the upper side away from the first frame 61*a* and the second frame 61*b* with respect to the center of the first fixing portion 81*a* and the center of the second fixing portion 82*a*. Furthermore, a gap GR is secured between the lower surface 78*u* of the bridge 78*a*, and the surface 61*f* of the first frame 61*a* and the second frame 61*b*. As a result, while ensuring a posture change in which the first frame 61*a* and the second frame 61*b* rotate around the X-axis parallel to the extending direction of the bridge 78*a* and the Z-axis perpendicular to the X-axis and parallel to the extending direction of the first frame 61*a*, the fitting between the first fixing portion 81*a* and the first concave portion 81*b* and the fitting between the second fixing portion 82*a* and the second concave portion 82*b* can be deepened to stabilize the coupling between the first frame 61*a* and the second frame 61*b* by the fixing member 78. Note that, when the size of the first fixing portion 81*a* and the second fixing portion 82*a* is increased, the adhesive area can be increased, making it easier to stabilize the fixing.

Figure 11:
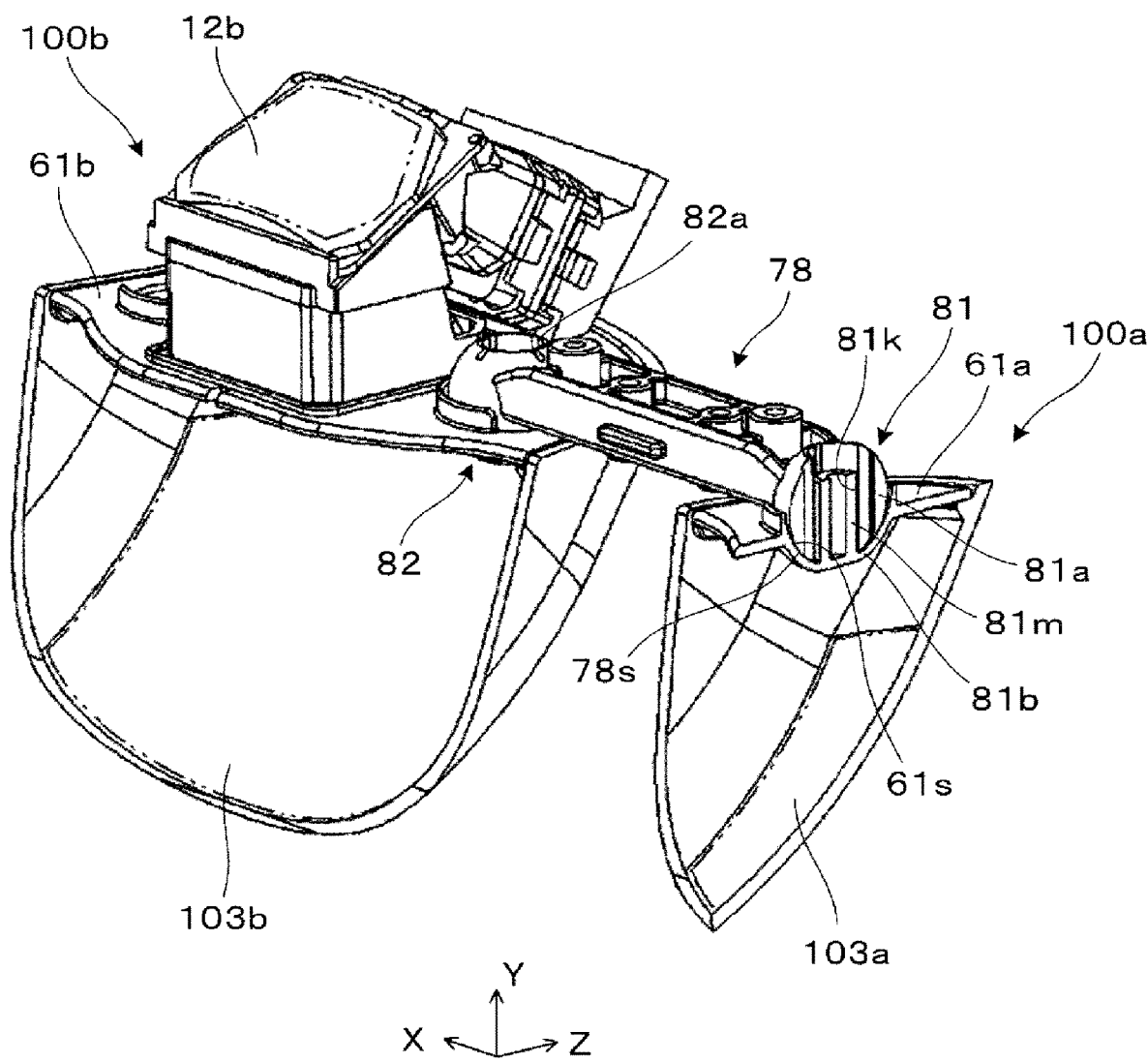
FIG. 11 is a partially broken perspective view illustrating a coupling, etc. between a first display unit and the fixing member.

FIG. 11 is a partially broken perspective view illustrating a state in which the fixing member 78 is fixed to the first display unit 100*a*. A first hole 81*k*, which passes a screw that screws the first frame 61*a* to the first fixing portion 81*a*, is formed at the first fixing portion 81*a*. A cylindrical boss 81*m*, formed in the center of the first concave portion 81*b* of the first frame 61*a* and extending in the Y direction, is inserted into the first hole 81*k* from below.

Figure 12A:
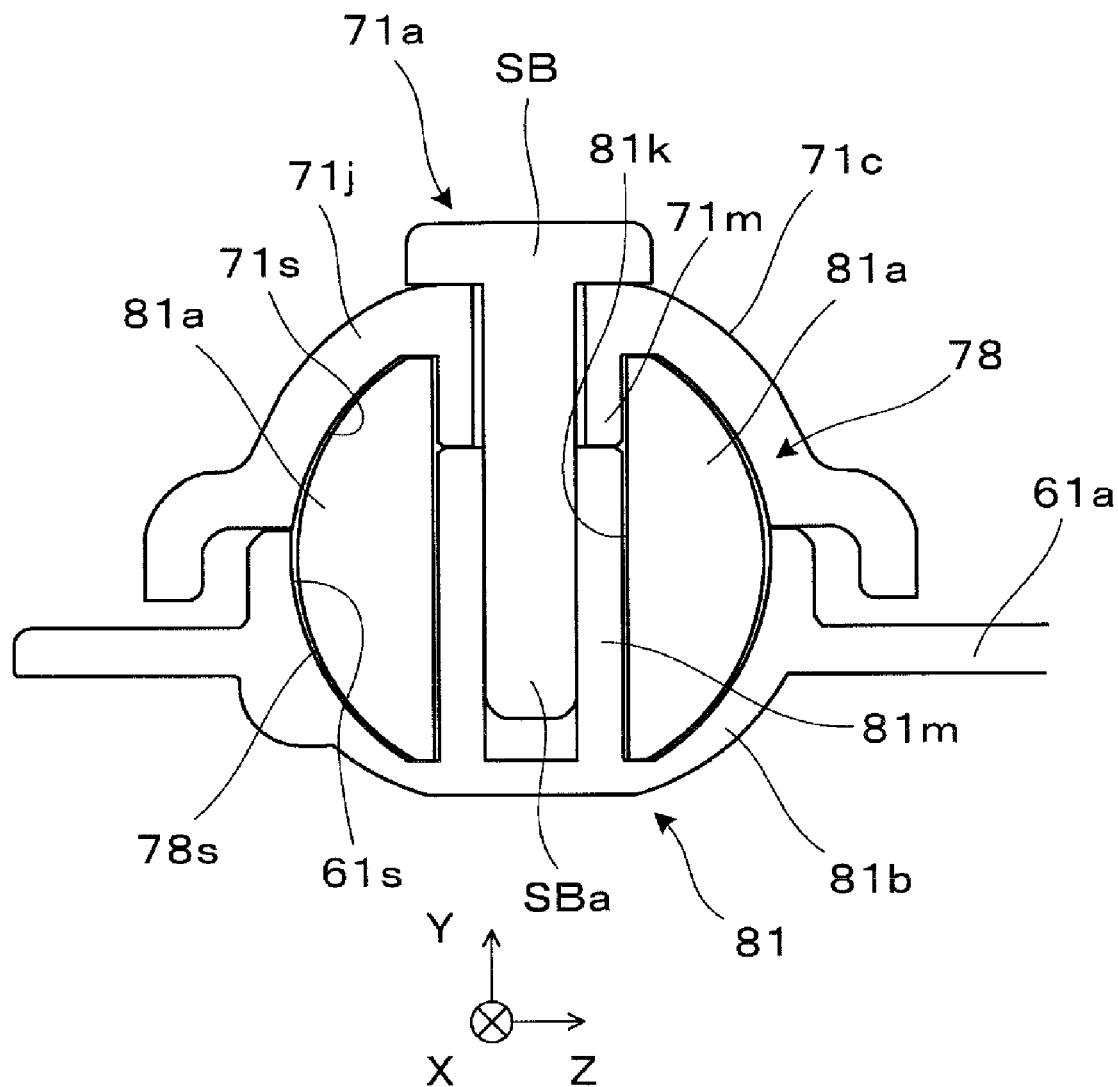
FIG. 12A is an enlarged cross-sectional view illustrating fixing of the first frame by a first fixing portion.

As illustrated in enlarged detail in FIG. 12A, the first fixing portion 81*a* of the fixing member 78 is fitted into the first concave portion 81*b* formed at the first frame 61*a*. A combination of the first fixing portion 81*a* and the first concave portion 81*b* is the bearing-shaped coupling member 81 that allows relative rotation in the three axial directions within a range of small angles. That is, the coupling member 81 has rotational degrees of freedom along three axes. The extending portion 71*c* of the first cover member 71*a* is disposed covering the coupling member 81. A hemispherical third concave portion 71*j* into which the first fixing portion 81*a* is inserted is formed at the extending portion 71*c*. A concave surface of the third concave portion 71*j* is referred to as an opposing surface 71*s*. The opposing surface 71*s* of the third concave portion 71*j* is disposed in the vicinity of the opposing surface 78*s* of the first fixing portion 81*a*. Here, the curvature of the spherical opposing surface 71*s* of the third concave portion 71*j* is set to be substantially equal to the curvature of the spherical opposing surface 78*s* of the first fixing portion 81*a*, unlike in the case of the first concave portion 81*b*. A cylindrical boss 71*m* extending in the vertical Y direction is formed in the center of the third concave portion 71*j*, and is inserted into the first hole 81*k* for screwing formed at the first fixing portion 81*a*. A screw SB is passed through the hole in the boss 71*m*, and a tip SBa of the screw SB is screwed into the boss 81*m* on a side of the first frame 61*a*. As a result, the first cover member 71*a* can be fixed to the first frame 61*a* so as to sandwich the fixing member 78 therebetween, and it is possible to reinforce the adhesion of the first fixing portion 81*a* with respect to the first frame 61*a*. An adhesive layer can also be provided between the opposing surface 78*s* of the first fixing portion 81*a* and the opposing surface 71*s* of the third concave portion 71*j* to strengthen the fixing.

Figure 12B:
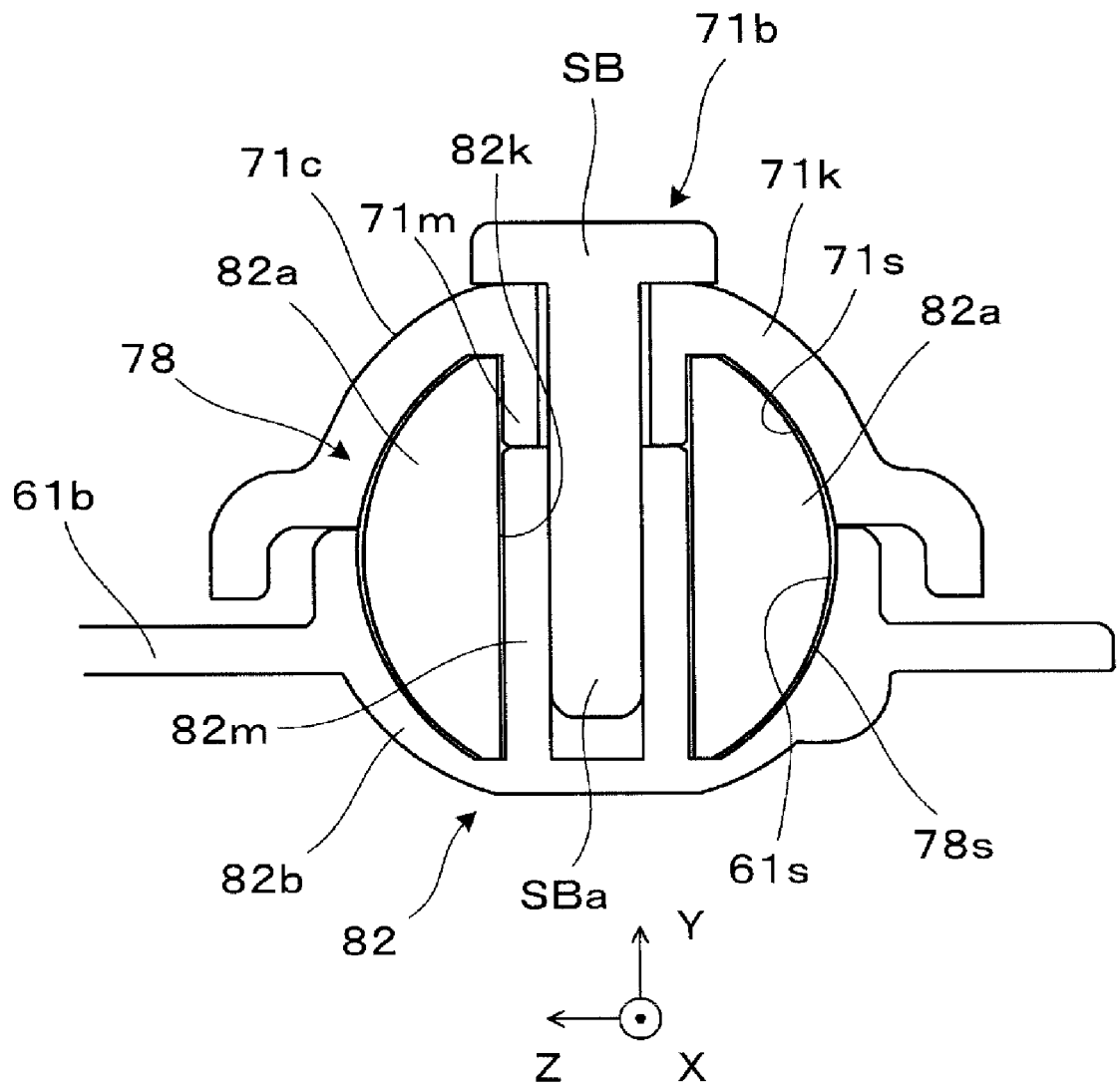
FIG. 12B is an enlarged cross-sectional view illustrating fixing of a second frame by a second fixing portion.

As illustrated in enlarged detail in FIG. 12B, the second fixing portion 82*a* of the fixing member 78 is fitted into the second concave portion 82*b* formed at the second frame 61*b*. A combination of the second fixing portion 82*a* and the second concave portion 82*b* is the bearing-shaped coupling member 82 that allows relative rotation in the three axial directions within a range of small angles. That is, the coupling member 82 has rotational degrees of freedom along three axes. The extending portion 71*c* of the second cover member 71*b* is disposed covering the coupling member 82. A hemispherical fourth concave portion 71*k* into which the second fixing portion 82*a* is inserted is formed at the extending portion 71*c*. A concave surface of the fourth concave portion 71*k* is referred to as an opposing surface 71*s*. The opposing surface 71*s* of the fourth concave portion 71*k* is disposed in the vicinity of the opposing surface 78*s* of the second fixing portion 82*a*. Here, the curvature of the spherical opposing surface 71*s* of the fourth concave portion 71*k* is set to be substantially equal to the curvature of the spherical opposing surface 78*s* of the second fixing portion 82*a*, unlike in the case of the second concave portion 82*b*. A cylindrical boss 71*m* extending in the vertical Y direction is formed in the center of the fourth concave portion 71*k*, and is inserted into the second hole 82*k* for screwing formed in the second fixing portion 82*a*. A screw SB is passed through the hole in the boss 71*m*, and a tip SBa of the screw SB is screwed into the boss 82*m* on a side of the second frame 61*b*. As a result, the second cover member 71*b* can be fixed to the second frame 61*b* so as to sandwich the fixing member 78 therebetween, and it is possible to reinforce the adhesion of the second fixing portion 82*a* with respect to the second frame 61*b*. An adhesive layer can also be provided between the opposing surface 78*s* of the second fixing portion 82*a* and the opposing surface 71*s* of the fourth concave portion 71*k* to strengthen the fixing.

Hereinafter, the manufacturing or assembling of the image display device 200 will be described. First, the first optical system 12*a* and the first combiner 103*a* are fixed to the first frame 61*a*, and the display element 11*a* is fixed while being positioned with respect to the first optical system 12a using the first holder 72a, etc. This results in a right eye unit RU including the first display unit 100a (see FIG. 4). In parallel, the second optical system 12b and the second combiner 103b are fixed to the second frame 61b, and the display element 11b is fixed while being positioned with respect to the second optical system 12b using the second holder 72b, etc. This results in a left eye unit LU including the second display unit 100b is obtained (see FIG. 4). Thereafter, the right eye unit RU and the left eye unit LU are set in a two-lineage measurement device, and the elastic sheet 75 is fixed on the first frame 61a and the second frame 61b by adhesion. At this time, the inner openings OP21, OP22 of the elastic sheet 75 are sealed by the first frame 61a and the second frame 61b. Furthermore, the fixing member 78 is moved so as to descend, and the first fixing portion 81a of the fixing member 78 is fitted into the first concave portion 81b of the first frame 61a, and the second fixing portion 82a of the fixing member 78 is fitted into the second concave portion 82b of the second frame 61b. The stage of the two-lineage measurement device is then utilized to precisely adjust the angle and arrangement of the right eye unit RU and the left eye unit LU. At this time, the right eye unit RU and the left eye unit LU can independently rotate in the R1 direction about the X-axis, the R2 direction about the Y-axis, and the R3 direction about the Z-axis, in a state where the right eye unit RU and the left eye unit LU are coupled by the fixing member 78 (see FIG. 4, etc.). After the position adjustment is complete, the adhesive supplied in advance between the first fixing portion 81a and the first concave portion 81b is cured, and the adhesive supplied in advance between the second fixing portion 82a and the second concave portion 82b is cured. This completes alignment of the right eye unit RU and the left eye unit LU. Thereafter, the first cover member 71a is covered so as to cover the first optical system 12a from above the first frame 61a, the inner circumferential portion 75b of the elastic sheet 75 is sandwiched between the first frame 61a and the first cover member 71a, and the boss 71m provided at the third concave portion 71j of the first cover member 71a is inserted into the first hole 81k of the first fixing portion 81a (see FIG. 12A). Thereafter, the screw SB is passed through the hole in the boss 71m and screwed into the boss 81m on the first frame 61a side facing the first hole 81k of the first fixing portion 81a. As a result, the fixing of the first cover member 71a with respect to the first frame 61a is completed. The method of fixing the second cover member 71b to the second frame 61b is the same as the method of fixing the first cover member 71a to the first frame 61a, so that description thereof is omitted. Next, the circuit board 91 is attached to the fixing member 78 using the substrate support portion 74, and the FPC extending from the display elements 11a, 11b is coupled to the circuit board 91. Finally, the lower exterior member 107b is fixed to the fixing member 78 using the pair of fastening portions 78z provided at the fixing member 78, and then the upper exterior member 107a is fixed to the lower exterior member 107b. At this time, the first frame 61a and the second frame 61b are allowed to shift slightly with respect to the lower exterior member 107b, and the positioning of the first display unit 100a and the first display unit 100b with respect to the fixing member 78 is maintained. Furthermore, by sandwiching the outer circumferential portion 75a of the elastic sheet 75 between the outer edge 7a of the upper exterior member 107a and the outer edge 7b of the lower exterior member 107b, sealing is achieved therebetween, and the interior space of the exterior member 107 is sealed.

The image display device 200 according to the above-described exemplary embodiment includes the first display unit 100a including the first frame 61a and the first optical system 12a, the second display unit 100b including the second frame 61b and the second optical system 12b, and the fixing member 78 configured to fix the first display unit 100a and the second display unit 100b relative to each other, wherein the fixing member 78 has a shape configured to rotate the first optical system 12a and the second optical system 12b in rotational directions around two or more axes when the first display unit 100a and the second display unit 100b are aligned prior to fixing. As a result, prior to fixing, the first display unit 100a and the second display unit 100b can be disposed and aligned at a high degree of freedom with respect to the fixing member 78.

A manufacturing method for the image display device 200 according to the above-described exemplary embodiment includes the first display unit 100a including the first frame 61a and the first optical system 12a, the second display unit 100b including the second frame and the second optical system 12b, and the fixing member 78 configured to fix the first display unit 100a and the second display unit 100b relative to each other, wherein the fixing member 78 has a shape configured to rotate the first optical system 12a and the second optical system 12b in rotational directions around two or more axes, and stops rotation of the first optical system 12a and the second optical system 12b with respect to the fixing member 78 after alignment. In this case, prior to fixing, the first display unit 100a and the second display unit 100b can be disposed and aligned at a high degree of freedom with respect to the fixing member 78. Furthermore, since the rotation of the first optical system 12a and the second optical system 12b with respect to the fixing member 78 is stopped after alignment, the relative positional relationship of the first display unit 100a and the second display unit 100b with respect to the fixing member 78 can be stably maintained.

MODIFIED EXAMPLES AND OTHERS

The present disclosure is described according to the above-described embodiments, but the present exemplary disclosure is not limited to the above-described embodiments. The present exemplary disclosure may be carried out in various modes without departing from the gist of the present disclosure, and, for example, the following modifications may be carried out.

The imaging optical system 20 incorporated into the first display unit 100a is not limited to that illustrated, and may have various configurations. Specifically, the imaging optical system 20 described above is the off-axis optical system OS that is asymmetric in the Y direction or the longitudinal direction, but may also be an off-axis optical system that is asymmetric in the X direction or the lateral direction. The optical elements constituting the imaging optical system 20 are merely exemplary in FIG. 8, and changes can be made, such as increasing or decreasing the number of lenses, adding a light-guiding member, etc.

A light control device that controls light by limiting the transmitted light of the combiners 103a, 103b can be attached on an external side of the combiners 103a, 103b. The light control device adjusts a transmittance, for example, electrically. Mirror liquid crystals, electronic shades, etc. may be used as the light control device. The light control device may adjust a transmittance according to outside light brightness.

The combiner 103a, 103b may be replaced with a mirror having light blocking properties. In this case, the optical system is a non-see-through type optical system that does not assume direct observation of an external image.

The first frame 61a, the second frame 61b, and the fixing member 78 are not limited to being formed from a metal material, and may be formed from fiber-reinforced plastic (FRP).

The structure of the coupling members 81, 82 is not limited to one having a ball joint shape, and can be replaced with various mechanisms having increased rotational degrees of freedom along two or more axes.

In the description above, although it was assumed that the image display device 100 was worn on the head and is used, the image display device 100 may also be used as a handheld display that is not worn on the head and is to be looked into like binoculars. In other words, the head-mounted display also includes a hand-held display in the present disclosure.

An image display device according to a specific aspect includes a first display unit including a first frame and a first optical system, a second display unit including a second frame and a second optical system, and a fixing member configured to fix the first display unit and the second display unit relative to each other, wherein the fixing member has a shape configured to rotate the first optical system and the second optical system in rotational directions around two or more axes when the first display unit and the second display unit are aligned prior to fixing.

In the image display device described above, the fixing member has a shape configured to rotate the first optical system and the second optical system in rotational directions around two or more axes, thus, prior to fixing, the first display unit and the second display unit can be disposed and aligned at a high degree of freedom with respect to the fixing member. Note that after alignment, the first display unit and the second display unit are fixed to the fixing member using an adhesive material or a fastener, so that these relative positional relationships can be stably maintained.

In a specific aspect, bearing-shaped coupling members are provided between the fixing member and the first display unit, and between the fixing member and the second display unit, respectively, each of the bearing-shaped coupling members having rotational degrees of freedom along three axes. In this case, the first display unit and the second display unit can be freely disposed with respect to the fixing member.

In a specific aspect, the coupling member is brought into a state where rotation is stopped after alignment. As a result, positional maintenance after alignment is ensured while maintaining free posture adjustment prior to alignment.

In a specific aspect, the fixing member includes a spherical first fixing portion provided on a side of the first frame and a spherical second fixing portion provided on a side of the second frame side, the first frame includes a hemispherical first concave portion into which the first fixing portion is inserted, the second frame includes a hemispherical second concave portion into which the second fixing portion is inserted, and the first fixing portion and the first concave portion serving as the coupling member and the second fixing portion and the second concave portion serving as the coupling member are joined together in an aligned state with an adhesive layer formed therebetween. In this case, posture adjustment can be performed by freely rotating the first frame and the second frame with respect to the fixing member by a simple fitting structure.

In a specific aspect, the first display unit includes a first cover member configured to cover the first fixing portion and the first optical system from an opposite side of the first frame, the first cover member includes a hemispherical third concave portion into which the first fixing portion is inserted, the second display unit includes a second cover member configured to cover the second fixing portion and the second optical system from an opposite side of the second frame, the second cover member includes a hemispherical fourth concave portion into which the second fixing portion is inserted, and the first fixing portion and the third concave portion are fixed to the second fixing portion and the fourth concave portion by screwing. In this case, the first cover member and the second cover member can be attached to the first frame and the second frame via the first fixing portion and the second fixing portion.

In a specific aspect, the first fixing portion and the first concave portion have spherical opposing surfaces having mutually different curvatures, and the second fixing portion and the second concave portion have spherical opposing surfaces having mutually different curvatures. In this case, it is easy to form an adhesive layer having sufficient thickness by injecting the adhesive material.

In a specific aspect, the first fixing portion and the third concave portion have spherical opposing surfaces having the same curvature, and the second fixing portion and the fourth concave portion have spherical opposing surfaces having the same curvature.

In a specific aspect, the first fixing portion includes the first hole through which a screw configured to screw the first frame to the first fixing portion is passed, and the second fixing portion includes the second hole through which a screw configured to screw the second frame to the second fixing portion is passed. In this case, the first frame can be reliably fixed with respect to the first fixing portion, whereby fixing strength can be ensured.

In a specific aspect, the fixing member includes a coupling portion configured to couple the first fixing portion and the second fixing portion, and the coupling portion is coupled to the first fixing portion and the second fixing portion on a side away from the first frame and the second frame with respect to a center of the first fixing portion and a center of the second fixing portion. As a result, while ensuring a posture change in which the first frame and the second frame rotate around an axis perpendicular to the extending direction of the coupling portion, the fitting between the first fixing portion and the first concave portion and the fitting between the second fixing portion and the second concave portion can be deepened to stabilize the coupling.

In a specific aspect, the fixing member includes a substrate support portion configured to support a circuit board. In this case, the circuit board can be supported with respect to the first frame or the second frame, whereby various members can be supported collectively with reference to the fixing member.

A manufacturing method for an image display device according to a specific aspect is a manufacturing method for an image display device including a first display unit including a first frame and a first optical system, a second display unit including a second frame and a second optical system, and a fixing member configured to fix the first display unit and the second display unit relative to each other, wherein the fixing member has a shape configured to rotate the first optical system and the second optical system in rotational directions around two or more axes, the fixing member being configured to, after alignment, stop rotation of the first optical system and the second optical system with respect to the fixing member.

In the manufacturing method described above, the fixing member has a shape configured to rotate the first optical system and the second optical system in rotational directions around two or more axes, thus, prior to fixing, the first display unit and the second display unit can be disposed and aligned at a high degree of freedom with respect to the fixing member. Furthermore, since the rotation of the first optical system and the second optical system with respect to the fixing member is stopped after alignment, the relative positional relationship of the first display unit and the second display unit with respect to the fixing member can be stably maintained.

What is claimed is:

1. An image display device comprising:
a first display unit that includes a first frame;
a second display unit that includes a second frame; and
a fixing member that fixes a first position of the first display unit with respect to a second position of the second display unit, wherein
the fixing member rotates the second display unit with respect to the first display unit in rotational directions around two or more axes,
the fixing member includes a spherical first fixing portion provided on a side of the first frame and a spherical second fixing portion provided on a side of the second frame,
the first display unit includes a first cover member configured to cover the first fixing portion from an opposite side of the first frame,
the first cover member includes a hemispherical third concave portion into which the first fixing portion is inserted,
the second display unit includes a second cover member configured to cover the second fixing portion from an opposite side of the second frame,
the second cover member includes a hemispherical fourth concave portion into which the second fixing portion is inserted, and
the first fixing portion and the third concave portion, and the second fixing portion and the fourth concave portion are fixed to each other by screwing.

2. The image display device according to claim 1, wherein bearing-shaped coupling members are provided between the fixing member and the first display unit, and between the fixing member and the second display unit, respectively, each of the bearing-shaped coupling members having rotational degrees of freedom along three axes.

3. The image display device according to claim 1, wherein
the first fixing portion has a spherical shape,
the second fixing portion has a spherical shape,
the first frame includes a hemispherical first concave portion into which the first fixing portion is inserted, and
the second frame includes a hemispherical second concave portion into which the second fixing portion is inserted.

4. The image display device according to claim 3, wherein
the first fixing portion and the first concave portion have spherical opposing surfaces having mutually different curvatures, and the second fixing portion and the second concave portion have spherical opposing surfaces having mutually different curvatures.

5. The image display device according to claim 1, wherein
the first fixing portion and the third concave portion have spherical opposing surfaces having the same curvature, and the second fixing portion and the fourth concave portion have spherical opposing surfaces having the same curvature.

6. The image display device according to claim 3, wherein
the first fixing portion includes a first hole through which a screw configured to screw the first frame to the first fixing portion is passed, and
the second fixing portion includes a second hole through which a screw configured to screw the second frame to the second fixing portion is passed.

7. The image display device according to claim 3, wherein
the fixing member includes a coupling portion configured to couple the first fixing portion and the second fixing portion, and
the coupling portion is coupled to the first fixing portion and the second fixing portion on a side away from the first frame and the second frame with respect to a center of the first fixing portion and a center of the second fixing portion.

8. The image display device according to claim 1, wherein
the fixing member includes a substrate support portion configured to support a circuit board.

9. An image display device comprising:
a first display unit that includes a first frame;
a second display unit that includes a second frame; and
a fixing member that fixes a first position of the first display unit with respect to a second position of the second display unit, wherein
the fixing member rotates the second display unit with respect to the first display unit in rotational directions around two or more axes,
the fixing member includes a spherical first fixing portion provided on a side of the first frame and a spherical second fixing portion provided on a side of the second frame,
the first fixing portion has a spherical shape,
the second fixing portion has a spherical shape,
the first frame includes a hemispherical first concave portion into which the first fixing portion is inserted,
the second frame includes a hemispherical second concave portion into which the second fixing portion is inserted,
the first fixing portion includes a first hole through which a screw configured to screw the first frame to the first fixing portion is passed, and
the second fixing portion includes a second hole through which a screw configured to screw the second frame to the second fixing portion is passed.

* * * * *